United States Patent
Cho

(10) Patent No.: US 7,508,480 B2
(45) Date of Patent: Mar. 24, 2009

(54) LIQUID CRYSTAL DISPLAY DEVICE WITH DUMMY PORTIONS

(75) Inventor: Soon Dong Cho, Gumi-Shi (KR)

(73) Assignee: LG Display Co., Ltd., Seoul (KR)

(*) Notice: Subject to any disclaimer, the term of this patent is extended or adjusted under 35 U.S.C. 154(b) by 636 days.

(21) Appl. No.: 11/168,406

(22) Filed: Jun. 29, 2005

(65) Prior Publication Data

US 2006/0092368 A1 May 4, 2006

(30) Foreign Application Priority Data

Oct. 28, 2004 (KR) ................. 10-2004-0086682

(51) Int. Cl.
*G02F 1/1345* (2006.01)

(52) U.S. Cl. .................... 349/150; 349/149

(58) Field of Classification Search .............. None
See application file for complete search history.

(56) References Cited

U.S. PATENT DOCUMENTS 5,945,984 A * 8/1999 Kuwashiro ............ 345/206
6,278,509 B1 * 8/2001 Ohga et al. ............ 349/150

* cited by examiner

*Primary Examiner*—Richard H Kim
(74) *Attorney, Agent, or Firm*—Birch, Stewart, Kolasch & Birch, LLP

(57) ABSTRACT

Liquid crystal display device including a liquid crystal panel having a plurality of gate lines and data lines, and at least one drive-IC having multi-channels, the multi-channels having linked channels connected to the gate lines or data lines and dummy channels not linked to the gate lines or the data lines. The linked channels may be arranged successively in a line and the dummy channels may be arranged at opposite ends of the line of the linked channels to thereby reduce dim block formation by shifting positions of the dummy portions.

19 Claims, 6 Drawing Sheets

LIQUID CRYSTAL DISPLAY DEVICE WITH DUMMY PORTIONS

CROSS-REFERENCE TO RELATED APPLICATION

This application claims the benefit of Korean Application No. P2004-86682 filed on Oct. 28, 2004, which is hereby incorporated by reference herein.

BACKGROUND OF THE INVENTION

1. Field of the Invention

The present invention relates to liquid crystal display devices, and more particularly, to a liquid crystal display device for improving a picture quality.

2. Discussion of the Related Art

In keeping pace with developments of an information oriented society, demands for display devices has increased in various forms. Recently, to meet the demands, various flat display devices such as LCDs (Liquid Crystal Display Device), PDPs (Plasma Display Panel), ELDs (Electro Luminescent Display), VFDs (Vacuum Fluorescent Display), and so on have been studied, some of which are being used as display devices in various apparatuses.

Of the various display devices, the LCD has been used mostly for mobile display devices owing to advantages of good picture quality, lightweight, thin profile, and low power consumption. In addition to mobile display devices such as monitors for notebook computers, the LCD has been developed in various forms as monitors for televisions for receiving and displaying a broadcasting signal and as monitors for desktop computers.

For using the LCD as general display devices, key development of the LCD lies in further realizing high quality picture, such as high definition, high luminance, and large sized picture, while maintaining the features of lightweight, thin profile, and low power consumption.

An LCD is provided with a liquid crystal panel for displaying a picture, and a driving unit for applying a driving signal to the liquid crystal panel. The liquid crystal display panel is provided with first and second glass substrates bonded together with a space between the substrates, and a liquid crystal layer between the first and the second glass substrates.

Formed on the first glass substrate (or a TFT array substrate) are a plurality of gate lines arranged at regular intervals in one direction, a plurality of data lines arranged at regular intervals perpendicular to the gate lines, a plurality of pixel electrodes on every pixel region defined at every intersection between the gate lines and the data lines in a form of matrix, and a plurality of thin film transistors (TFT) to be switched in response to a signal on the gate line for transmission of a signal on the data line to each pixel electrode.

Formed on the second glass substrate (or a color filter substrate) are a black matrix layer for shielding a light incident on parts excluding the pixel regions, R, G, and B color filter layers for expressing colors, and a common electrode for displaying a picture.

A driving principle of a general liquid crystal display device lies on using optical anisotropy and polarizing properties of liquid crystals. Since the liquid crystal is thin and elongated, molecules of the liquid crystals tend to orient such that applying an electric field to the liquid crystals can control orientation of a molecular arrangement of the liquid crystals.

Therefore, if the orientation of the molecular arrangement of the liquid crystals is controlled, the molecular arrangement of the liquid crystals is controlled, and the light refracts in a direction of the desired orientation of the molecular arrangement of the liquid crystals, thereby enabling the display of the picture information.

Presently, the Active Matrix LCD, in which thin film transistors and pixel electrodes connected thereto are arranged in a matrix, has attracted the most interest due to its good resolution and motion picture implementing capability.

A related art liquid crystal display device will be described with reference to the attached drawings.

Referring to FIG. 1, the related art liquid crystal display panel is provided with a first substrate 1 and a second substrate 2 bonded together with a space between the substrates, and liquid crystals 3 between the first substrate 1 and the second substrate 2.

Arranged on the first substrate 1 are a plurality of gate lines 4 at regular intervals in one direction, and a plurality of data lines 5 at regular intervals perpendicular to the gate lines 4 to define pixel regions 'P', wherein a pixel electrode 6 is formed on each of pixel regions 'P'. A plurality of thin film transistors 'T' are respectively formed at portions where the gate lines 4 and the data lines 5 intersect so as to be driven in response to a signal on the gate line 4 for transmission of a data signal from the data line 5 to each pixel electrode 6.

A black matrix layer 7 is formed on the second substrate 2 for shielding light incident on portions excluding the pixel regions 'P'. R, G, and B color filter layers 8 for expressing colors and a common electrode 9 are also formed on the second substrate 2 for displaying a picture.

The thin film transistor 'T' is provided with a gate electrode projected from the gate line 4, a gate insulating film (not shown) is formed on an entire surface, an active layer (not shown) is formed on the gate insulating film over the gate electrode, a source electrode is projected from the data line 5, and a drain electrode is spaced a predetermined distance from the source electrode.

The pixel electrode 6 is in contact with the drain electrode for being turned on/off in response to a signal received as the thin film transistor 'T' is driven. The pixel electrode 6 is formed from a transparent conductive metal having a good light transmittivity such as ITO (Indium Tin Oxide).

FIG. 2 illustrates an enlarged view showing a wiring of a pixel region, a link region, and a pad region of a related art liquid crystal display device.

Referring to FIG. 2, the wiring of the related art liquid crystal display device is formed such that a space between adjacent lines becomes smaller as the wiring proceeds from the pixel region to the pad region via the link region. This is because a drive-IC (not shown) formed opposite to the pad region for receiving line signals from a system has a width relatively smaller than a width of the plurality of the gate lines or data lines connected to the drive-IC. The gate lines or the data lines in the pixel region 15a are extended to pad lines 15c via link lines 15b.

A configuration at a center portion 'C' is different from a configuration at an edge portion E. That is, while the wiring at the center portion 'C' of the drive-IC runs on a straight line through the pixel region, the link region, and the pad region, the wiring at the edge portion 'E' of the drive-IC has different pitches between the wiring 15a at the pixel region and the wiring 15c at the pads, the pitch of the wiring at the link 15b between the pixel region and the pad region is reduced as the wiring goes from the pixel region toward the pad region.

FIG. 3 illustrates a plan view of a wiring of a related art liquid crystal display device, and FIG. 4 illustrates an enlarged view of wiring of a third Tape Carrier Package (TCP) in FIG. 3.

Referring to FIG. 3, the related art liquid crystal display device is provided with a liquid crystal panel 10 having first substrate 1 and a second substrate 2 opposite each other and a liquid crystal layer (not shown) between the first and second substrates 1 and 2. The liquid crystal display panel 10 has a pixel region (inside the dashed lines) defined at a center portion and a non-display portion (outside the dashed lines) defined on an outside of the pixel region. The non-display portion is provided with a pad region where gate drive-ICs 12 and data drive-ICs 14 are connected thereto with respective gate TCPs 11a~11d, and data TCPs 13a~13c and 23a~23c, and a link region between the pixel region and the pad region where the link wiring passes.

The gate drive-ICs 12 and the data drive-ICs 14 are connected to the pad region with corresponding TCP film. In the drawing, the gate drive-ICs 12 are connected to the pad region of the liquid crystal panel 10 with first to fourth gate TCPs 11a, 11b, 11c, and 11d respectively, and the data drive-ICs 14 are connected to the pad region of the liquid crystal panel 10 with first to sixth data TCPs 13a, 13b, 13c, 23a, 23b, and 23c.

If the liquid crystal display device is driven in a two port system, i.e. if the first to third data TCP 13a, 13b, and 13c and the fourth to sixth data TCP 23a, 23b, and 23c receive data voltage signals from ports of a system different from each other, there are surplus first dummy portion 20a and a second dummy portion 20b at ends of the ports which do not receive signals from the ports.

The total number of output pins of the data TCPs 13a, 13b, 13c, 23a, 23b, and 23c are not the same with a total number of the data lines 15a on the liquid crystal panel 10. Therefore, in the two port system, if the pins of the data TCP are connected to the data lines 15a starting from a left side of the first port in succession, there are pins at an end of the first port, i.e. an end of the third TCP 13c, which do not have corresponding data lines 15a of the liquid crystal panel 10 and are left as surplus. Similarly, there are surplus pins at an end of the sixth TCP 23c. Thus, there are dummy pins (or called channels) at the third and sixth data TCPs 13c and 23c and are called as TCP dummy portions 20a and 20b, respectively. There are two dummy portions 20a and 20b in the two port system.

If there are more than two ports in the liquid crystal panel 10, the number of dummy portions at ends of the ports will match the number of the ports typically.

Referring to FIG. 4, there are six dummy pins at an end of the third data TCP 13c of the end of the first portion, i.e. at the first dummy portion 20a. It is likely that there is a same number of dummy pins at the second dummy portion 20b.

It is assumed that the liquid crystal display device of the related art is in an SXGA display, with a resolution of 1280× 1024. Thus, there are 1280×3=3840 data lines in the pixel region.

If it is assumed that there are 642 pins in each data TCP, and data mapping (connection of the pins of the data TCP to the data lines) is started from the left side, though all pins (642 pins) of the first data TCP 13a and the second data TCP 13b are matched and connected to the data lines 15a, only 636 pins of the third data TCP 13c are matched and connected to the data lines 15a. This leaves right most 6 dummy pins in the third data TCP 13c unmatched and unconnected to the data lines of the pixel region as illustrated in FIG. 4.

That is, the first data TCP 13a has the first to 642nd data lines (#1~#642) connected thereto, the second data TCP 13b has 643rd to 1284th data lines (#643~#1284) connected thereto, and the third data TCP 13c has 1285th to 1920th data lines (#1285~#1920) connected thereto.

Moreover, the fourth data TCP 23a has 1921st to 2562nd data lines (#1921~#2562) connected thereto, the fifth data TCP 23b has 2563rd to 3204th data lines (#2563~#3204) connected thereto, and the sixth data TCP 23c has 3205th to 3840th data lines (#3205~#3840) connected thereto.

Thus, there are first and second dummy portions 20a and 20b each with 6 pins at right side ends of the third data TCP 13c and the sixth data TCP 23c, respectively.

It should be noted that the number of dummy pins can change according to the number of pins of the TCP. That is, the number of dummy pins is a difference of a number of the output pins of the data TCPs and a number of the data lines 15a.

The first dummy portion 20a between the third data TCP 13c and the fourth data TCP 23a causes a link resistance difference between the first dummy portion 20a and the link wiring in the vicinity of the first dummy portion 20a. As a result, a dim block is formed in the vicinity of the first dummy portion 20a causing a difference of luminance from neighboring portions of the panel.

That is, the dummy pins of the TCP dummy portion have resistance differences from neighboring link wiring, which causes differences in the rising and falling of the data signal supplied from a source drive-IC. This in turn causes a charging performance difference of pixel regions leading to a formation of the dim block at an interface of the drive-ICs.

SUMMARY OF THE INVENTION

Accordingly, the present invention is directed to a liquid crystal display device that substantially obviates one or more problems due to limitations and disadvantages of the related art.

In an embodiment of the present invention, a liquid crystal display device is provided in which a position of a dummy portion is shifted from a portion between TCPs (or drive-ICs) to an outermost portion for preventing the dim block from forming.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, a liquid crystal display device includes a liquid crystal panel having a plurality of gate lines and data lines, and at least one drive-IC having multi-channels, the multi-channels including linked channels connected to the gate lines or data lines, and dummy channels not linked to the gate lines or the data lines, wherein the linked channels are arranged successively in a line, and the dummy channels are arranged at opposite ends of the line of the linked channels.

In another aspect of the present invention, a liquid crystal display device includes a liquid crystal panel having a pixel region defined at a central portion, and a pad region defined on an outside of the pixel region, a TCP (Tape Carrier Package) connected to the pad region, the TCP having a drive-IC, and dummy portions at opposite outermost sides of the pad region.

In another aspect of the present invention, a liquid crystal display device includes a liquid crystal panel having a pixel region defined at a central portion, and a pad region defined on an outside of the pixel region, a plurality of gate TCPs connected to the pad region and gate lines on the pixel region, each of the gate TCPs having a gate drive-IC, a plurality of data TCPs connected to the pad region and data lines on the pixel region, each of the data TCPs having a data drive-IC, and dummy portions at data TCPs at opposite outermost sides of a corresponding side of the pad region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Figure 1:
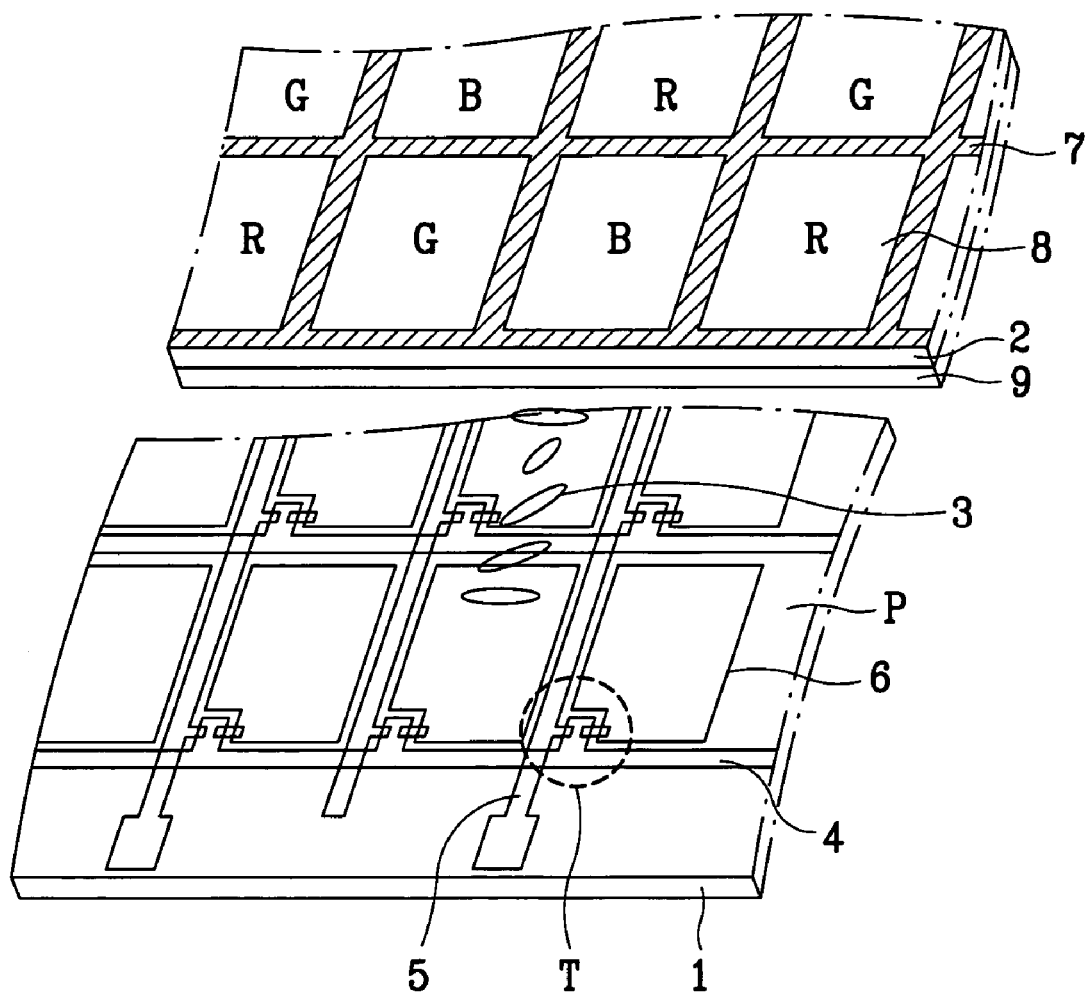
FIG. 1 illustrates an exploded perspective view of a related art liquid crystal display device.
Figure 2:
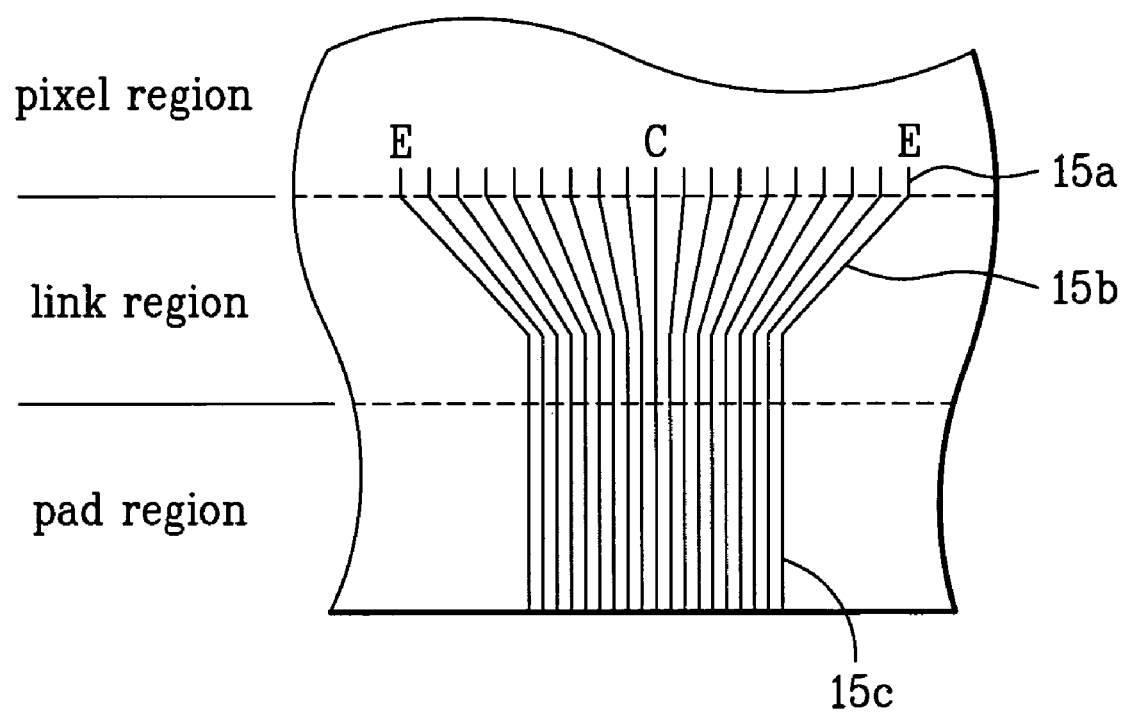
FIG. 2 illustrates an enlarged view showing a wiring of a pixel region, a link region, and a pad region of a related art liquid crystal display device.
Figure 3:
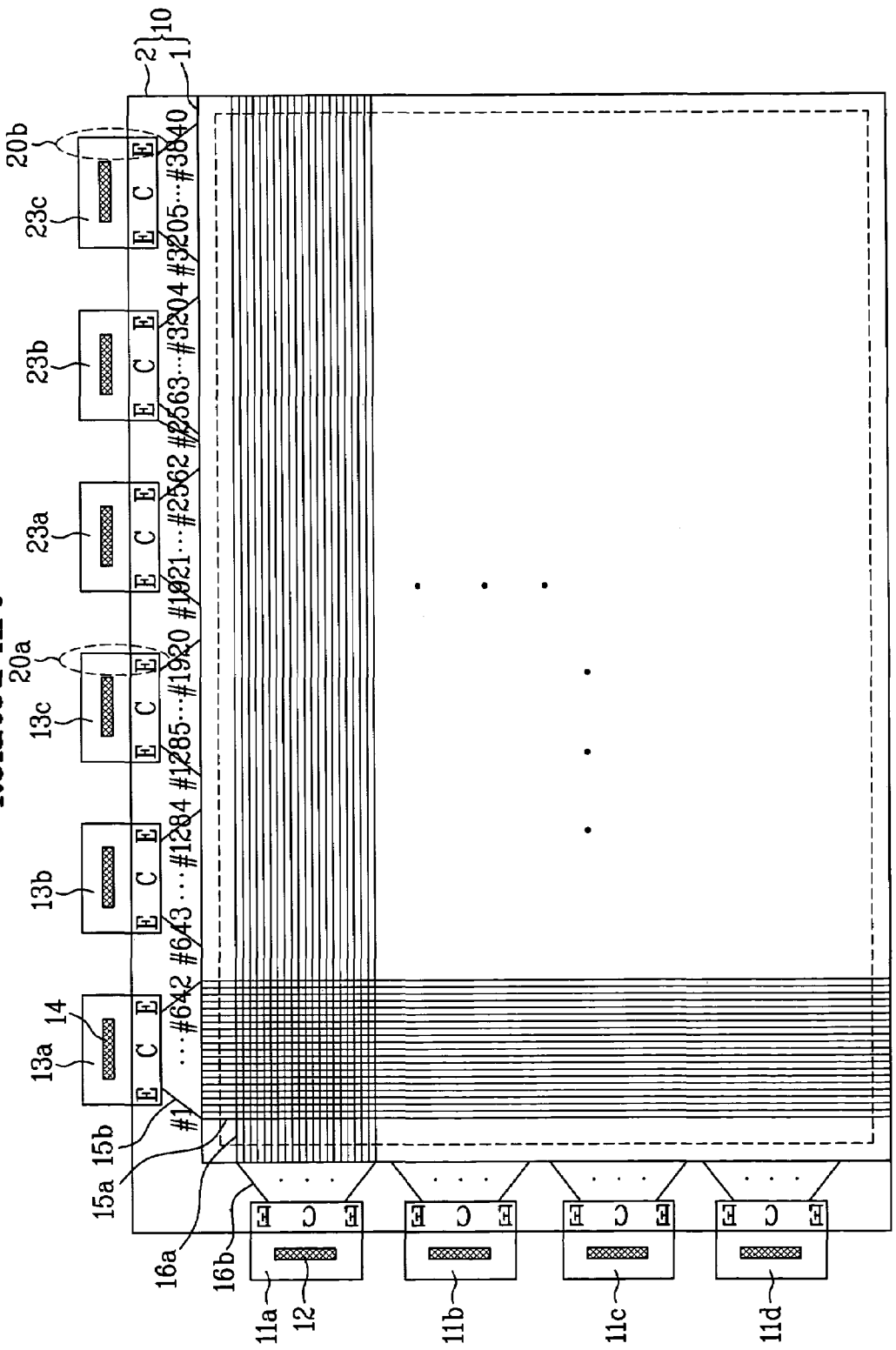
FIG. 3 illustrates a plan view of a wiring of a related art liquid crystal display device.
Figure 4:
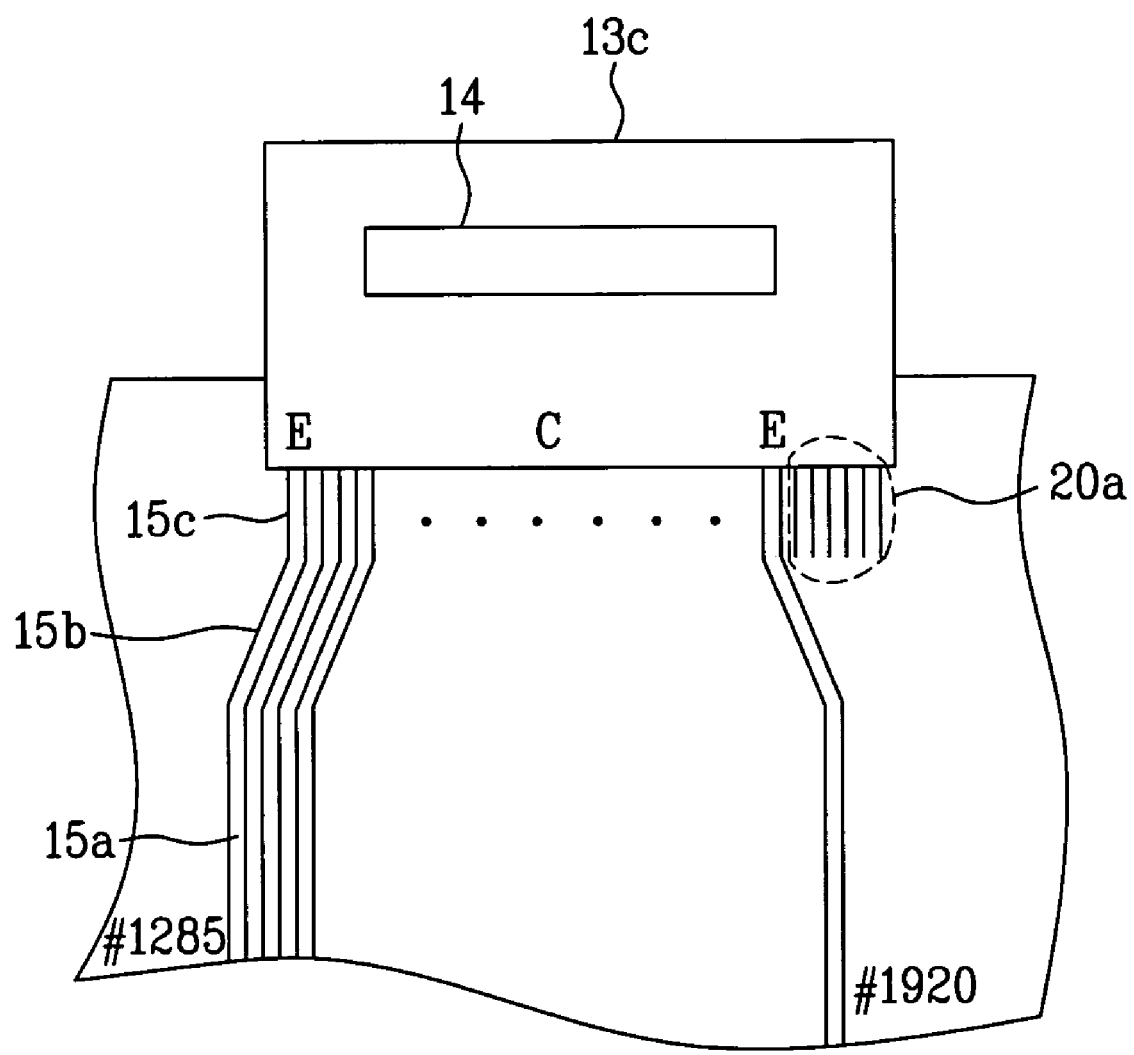
FIG. 4 illustrates an enlarged view of wiring of the third TCP in FIG. 3.
Figure 5:
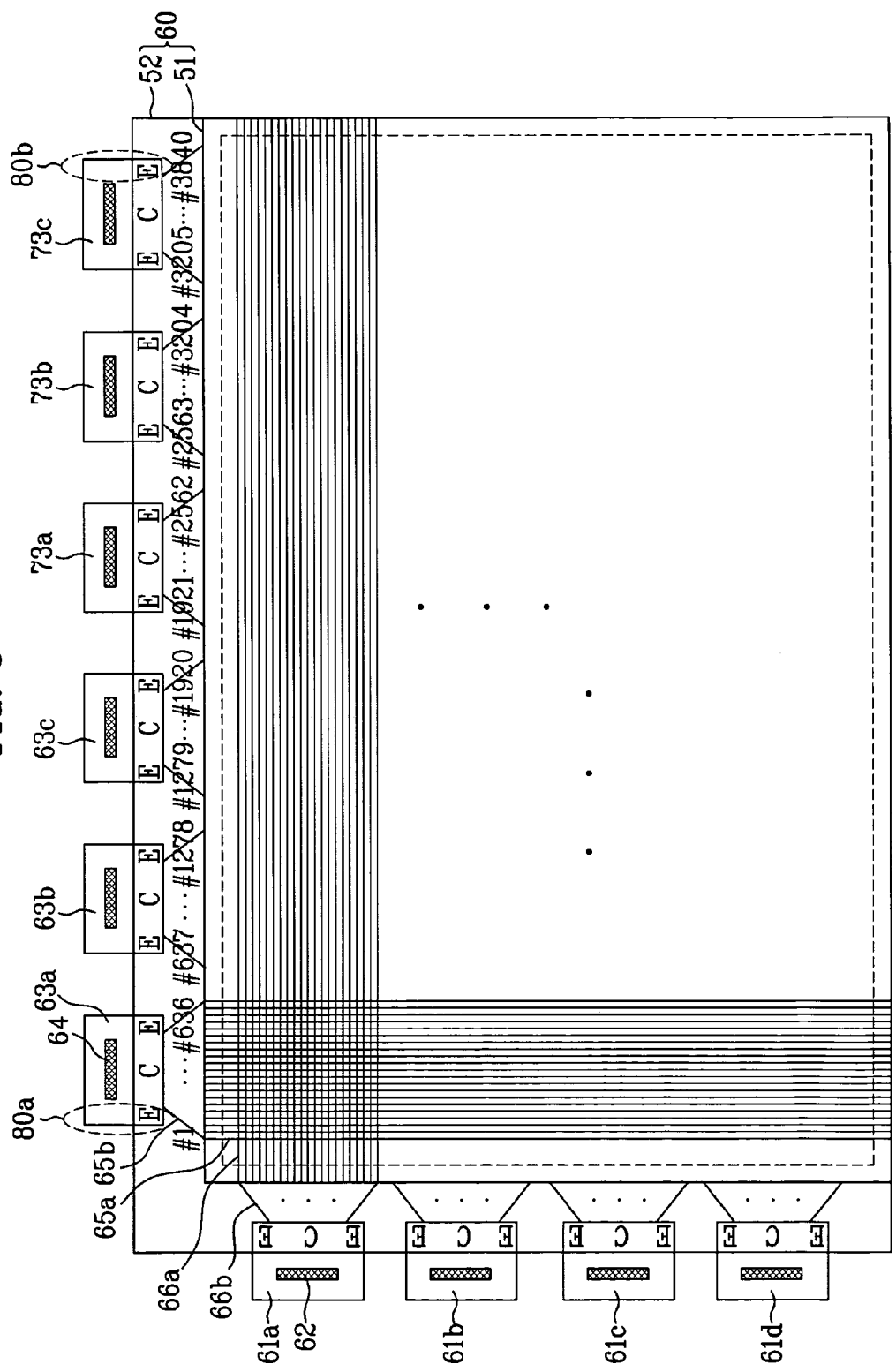
FIG. 5 illustrates a plan view of wiring of a liquid crystal display device in accordance with an embodiment of the present invention.
Figure 6:
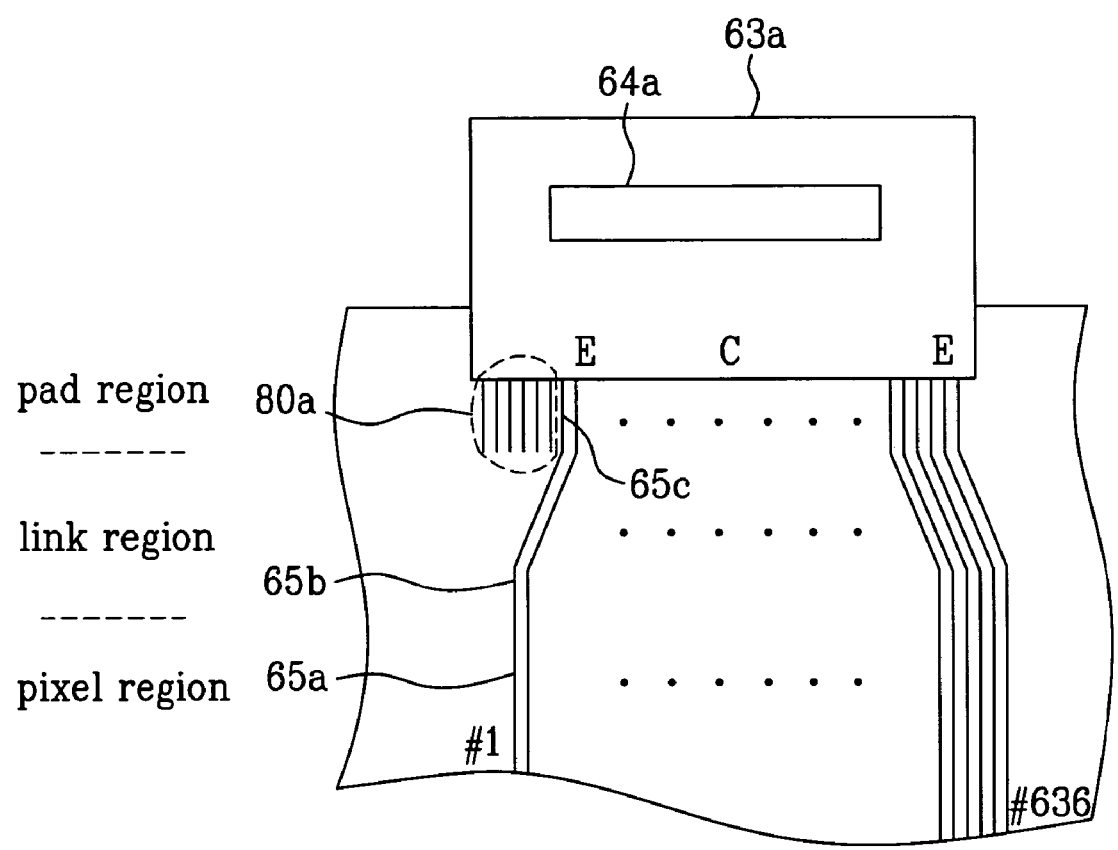
FIG. 6 illustrates an enlarged view of wiring of the first data drive-IC in FIG. 5.

FIG. 5 illustrates a plan view of wiring of a liquid crystal display device in accordance with an embodiment of the present invention, and FIG. 6 illustrates an enlarged view of wiring of the first data drive-IC in FIG. 5.

Referring to FIG. 5, the liquid crystal display device may include a liquid crystal display panel 60 having a first substrate 51 and a second substrate 52 opposite each other, and a liquid crystal layer (not shown) between the first and second substrates 51 and 52. The liquid crystal panel 60 may have a pixel region (within the dash line) defined at a central portion of the liquid crystal panel and a non-display region (outside of the dashed line) defined on an outside of the pixel region. The non-display portion may include a pad region gate drive-ICs 62 and data drive-ICs 64 mounted thereon and a link region between the pixel region and the pad region through which the link wiring passes.

The gate drive-ICs 62 and the data drive-ICs 64 may be connected to the pad region through TCP films. The gate drive-ICs 62 may be connected to the pad region of the liquid crystal panel 60 with first to fourth gate TCPs 61a, 61b, 61c, and 61d, respectively, and the data drive-ICs 64 may be connected to the pad region of the liquid crystal panel with first to sixth data TCP 63a, 63b, 63c, 73a, 73b, and 73c.

The liquid crystal display device may be driven by a two port system, and the first to third data TCPs 63a, 63b, and 63c may receive data voltage signals from a port of the system different from the fourth to sixth data TCPs 73a, 73b, and 73c.

The total number of pins of the data TCPs may not be the same as the total number of data lines 65a on the liquid crystal panel 60. In this case, the total number of output pins formed on the first to sixth data TCPs 63a~63c and 73a~73c may be greater than the total number of data lines 65a formed on the pixel region. The number of surplus output pins of the first to sixth data TCPs 63a~63c and 73a~73c may be equally divided and arranged on opposite outermost sides of the pad region of the first to sixth data TCPs 63a~63c and 73a~73c. That is, the first dummy portion 80a including a first dummy pin may be positioned at the first data TCP 63a. The second dummy portion 80b including a second dummy pin may be positioned at the sixth data TCP 73c. The link pins of the first to sixth data TCPs 63a~73c, which may be one to one matched and connected to the data lines 65a between the first dummy pin and the second dummy pin, may be positioned successively.

Accordingly, since rest of output pins of the data TCPs 63a~73c excluding the dummy pins of the first to second dummy portions 80a and 80b are one to one matched and connected to the data lines 65a without any surplus unmatched pins, formation of the dim block within the pixel region due to the dummy pins may be minimized.

As an example, the liquid crystal display device shown in FIG. 5 is assumed to be an SXGA class display having a liquid crystal panel with a resolution of 1280×1024 and a pixel region with 1280×3=3840 data lines.

If it is assumed that each of the data TCPs 63a~63c, and 73a~73c has 642 pins, and a total 6 data TCPs 63a~63c and 73a~73c are formed at the liquid crystal panel 60, a total number of pins of the data TCPs 63a~63c, and 73a~73c are 642×6=3852. In this instance, since the SXGA class liquid crystal panel 60 has a total 3840 data lines 65a within the pixel region (inside of the dashed line), there are a total 12 dummy output pins. In the liquid crystal display device of the embodiment of the present invention, six dummy output pins are positioned at a left outer side of the first data TCP 63a and six dummy output pins are positioned at a right outer side of the sixth data TCP 73c. As such, since no dummy pins are positioned at any portion of the liquid crystal digital panel 60 where the signal is applied thereto, the dim block caused by the dummy pins can be prevented or minimized in the neighborhood of the dummy pins.

Referring to FIG. 6, it can be seen that the first data TCP 63a having the data drive-IC formed thereon may have 6 pins arranged from a left side in succession without connection to the pixel region, and a seventh pin may be connected to a first data line of the pixel region. The first data TCP 63a may have a total 636 pins starting from the seventh pin connected to the data lines on the pixel region, starting from the first data line to a 636th data line (#1~#636) in succession, the second data TCP 63b may have a total 642 pins connected to the data lines, starting from a 637th data line to a 1278th data line (#637~#1278) without surplus, and the third data TCP 63c may also have a total 642 pins connected to the data lines without surplus, starting from a 1279th data line to a 1920th data line (#1279~#1920). The fourth data TCP 73a may have a total 642 pins connected to the data lines, starting from a 1921st data line to a 2562nd data line (#1921~#2562), the fifth data TCP 73b may have a total 642 pins connected to the data lines, starting from a 2563rd data line to a 3204th data line (#2563~#3204), and the sixth data TCP 73c may have a total 636 pins connected to the data lines, starting from a 3205th data line to a 3840th data line (#3205~#3840). That is, starting from the first data TCP 63a to the sixth data TCP 73c, the data TCPs may be connected to 636, 642, 642, 642, 642, and 636 pins in succession.

Similarly, if there is a difference between a number of output pins of the gate TCPs 61a~61d and a number of gate lines 66a, the dummy pins not connected to the gate lines on the pixel region may be arranged on opposite (outer) sides of the gate pad region.

As has been described, the liquid crystal display device of the embodiment of the present invention has the following advantages.

The assigning of the dummy portions having dummy pins which are not connected to the line on the pixel region to the outermost portions of the pad region prevents the difference of link resistance between the dummy portion and a neighboring portion. This enables the link resistances between link wiring to be uniform or substantially uniform. Thus, the dim block caused by resistance difference between the line wiring can be prevented or minimized. Moreover, the shifting of the dummy portions to outermost sides of the pad region is favorable in design. That is, by preventing the output pins that are not connected to the wiring from being positioned between the data lines, picture quality drop can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
a liquid crystal panel having a plurality of gate lines and data lines; and
at least one drive-IC having multi-channels, the multi-channels having linked channels connected to the gate lines or data lines, and dummy channels not linked to the gate lines or the data lines,
wherein the linked channels are arranged successively in a line, and the dummy channels are arranged at opposite ends of the line of the linked channels, and
wherein the dummy channels are connected to the at least one drive-IC and are configured to receive driving signals from the at least one drive-IC.

2. The device as claimed in claim 1, wherein a number of the dummy channels at opposite ends are substantially equal.

3. The device as claimed in claim 1, wherein the dummy channels are positioned at edge portions of the liquid crystal panel.

4. The device as claimed in claim 1, wherein the link channels and the dummy channels are positioned at a pad region of the liquid crystal panel.

5. The device as claimed in claim 1, wherein the at least one drive-IC is provided for driving the data lines.

6. The device as claimed in claim 1, wherein the at least one drive-IC is provided for driving the gate lines.

7. The device as claimed in claim 1, further comprising at least one Tape Carrier Package (TCP) for electrical connection between the multi-channels of the at least one drive-IC and the gate or the data lines.

8. The device as claimed in claim 1, wherein the dummy channels have a same width as the linked channels.

9. A liquid crystal display device, comprising:
a liquid crystal panel having a pixel region defined at a central portion, and a pad region defined on an outside of the pixel region;
a TCP (Tape Carrier Package) connected to the pad region, the TCP having a drive-IC; and
dummy portions at opposite outermost sides of the pad region,
wherein the dummy portions are connected to the drive-IC and are configured to receive driving signals from the drive-IC.

10. The device as claimed in claim 9, wherein the TCP includes a plurality of gate TCPs, and
wherein the dummy portions are formed at gate TCPs disposed at the outermost sides of the pad region and are not formed at gate TCPs between the gate TCPs disposed at the outermost sides of the pad region.

11. The device as claimed in claim 9, wherein the TCP includes a plurality of data TCPs, and
wherein, of the plurality of the data TCPs, the dummy portions are formed at data TCPs disposed at the outermost sides of the pad region and are not formed at data TCPs between the data TCPs disposed at the outermost sides of the pad region.

12. The device as claimed in claim 9, wherein the plurality of data TCPs have signals applied thereto in an at least a two port system.

13. The device as claimed in claim 9, wherein the dummy portions are portions each having no connection between output pins of the TCP and gate or data lines on the pixel region.

14. The device as claimed in claim 9, wherein the drive-IC includes multi-channels, the multi-channels having linked channels connected to the gate lines or data lines, and the dummy portions not linked to the gate lines or the data lines, and
wherein the dummy portions have a same width as the linked channels.

15. A liquid crystal display device, comprising:
a liquid crystal panel having a pixel region defined at a central portion, and gate and data pad regions outside of the pixel region;
a plurality of gate TCPs (Tape Carrier Package) connected to the gate pad region and gate lines of the pixel region, each of the gate TCPs having a gate drive-IC;
a plurality of data TCPs connected to the data pad region and data lines of the pixel region, each of the data TCPs having a data drive-IC;
dummy portions at data TCPs disposed at opposite outermost sides of the data pad regions,
wherein the dummy portions are connected to the drive-IC and are configured to receive driving signals from the drive-IC; and
wherein the dummy portions are not formed at data TCPs between the data TCPs disposed at the outermost sides of the pad region.

16. The device as claimed in claim 15, wherein the plurality of data TCPs have signals applied thereto in an at least a two port system.

17. The device as claimed in claim 15, wherein the dummy portions are portions each data TCP having no connection between output pins of the data TCP and the data lines on the pixel region.

18. The device as claimed in claim 15, wherein the dummy portions include first and second dummy portions, the first and second dummy portions substantially occupying a same area at the opposite outermost sides of the data pad region.

19. The device as claimed in claim 15, wherein the drive-IC includes multi-channels, the multi-channels having linked channels connected to the gate lines or data lines, and the dummy portions not linked to the gate lines or the data lines, and
wherein the dummy portions have a same width as the linked channels.

* * * * *